United States Patent [19]

Hartmann et al.

[11] Patent Number: 4,607,971

[45] Date of Patent: Aug. 26, 1986

[54] SHAFT COUPLING

[75] Inventors: Max Hartmann, Baden; Michel Rollier, Nussbaumen, both of Switzerland

[73] Assignee: BBC Brown, Boveri & Company, Limited, Baden, Switzerland

[21] Appl. No.: 637,816

[22] Filed: Aug. 6, 1984

[30] Foreign Application Priority Data

Oct. 24, 1983 [CH] Switzerland ............... 5748/83

[51] Int. Cl.⁴ .................................. F16D 9/00
[52] U.S. Cl. ............................ 403/2; 403/11; 403/337; 464/32
[58] Field of Search .......... 403/11, 337, 2; 464/32, 464/33

[56] References Cited

U.S. PATENT DOCUMENTS

| | | | | |
|---|---|---|---|---|
| 1,637,944 | 8/1927 | Keller | | 403/2 X |
| 2,446,133 | 7/1948 | Hawthorne | | 464/32 |
| 2,585,113 | 2/1952 | Gredell | | 403/377 X |
| 3,975,923 | 8/1976 | Grimpe | | 403/2 X |
| 4,028,909 | 6/1977 | Jancic et al. | | 464/32 |
| 4,447,217 | 5/1984 | Blandford | | 464/32 |

FOREIGN PATENT DOCUMENTS 446683 12/1974 U.S.S.R. ................ 403/337

Primary Examiner—Andrew V. Kundrat
Attorney, Agent, or Firm—Burns, Doane, Swecker & Mathis

[57] ABSTRACT

In order to prevent expensive subsequent damage because of a shaft fracture in machines which are coupled together, one of the two shaft ends is provided outside of one coupling flange with a predetermined breaking point. At one coupling flange a safety element is mounted which extends past the axial length of the predetermined breaking point. The safety element can be constructed as a pin rotatably mounted inside the shaft end or as a safety ring mounted around the shaft end to hold a fractured shaft in the predetermined position until standstill without it being possible for the shaft to be deflected.

14 Claims, 3 Drawing Figures

SHAFT COUPLING

The present invention relates to shaft couplings for connecting two rotating machine shafts.

BACKGROUND OF THE INVENTION

In the case of rigid couplings, the shaft can suffer a torsional fracture, for example as a result of damage on the driven machine, which can cause the still rotating shaft to be deflected and hurled away.

OBJECTS AND SUMMARY OF THE INVENTION

The invention has the object of creating a shaft coupling in which, in the event of a torsional fracture of the shaft, subsequent damage caused by the broken shaft is prevented.

The aforementioned object is achieved by means of constructing one of the two shaft ends with a predetermined breaking point.

The predetermined breaking point is preferably on the shaft of the driven machine in front of the coupling flange. The arrangement of a guiding or safety element is such that, in the event of overloading, the coupling breaks at a predetermined point and the guiding element prevents deflection of the shaft and thus expensive subsequent damage.

Essentially, two different embodiments of the subject-matter of the invention exist, one which has a safety pin and one which has a safety ring.

The embodiment having a safety pin is constructionally simple. This embodiment has a minimum of additional parts and is of advantage when sufficient space is available for axial installation.

In a modified form of this embodiment, less space is required, enabling subsequent installation to be carried out particularly if the two machines are not coupled directly but via an intermediate shaft.

Since the pin end reaches past the predetermined breaking point, in the event of a fracture, the shaft stub is guided by this pin end, and held in the predetermined position. This prevents the broken shaft part from being deflected.

A second embodiment of the invention has a safety ring that does not require any special shaft holes. The safety ring can be dimensioned within comparatively wide limits in accordance with the demands made on it, since its outside diameter can reach the diameter of the coupling flange. The predetermined breaking point can also be independently dimensioned.

The second embodiment provides the advantage that, as a result of arranging the axially split bush between the safety ring and the shaft, no great accuracy of fit is required for the safety ring. In comparison, an additional axially split bush can be omitted in the arrangement of the shaft collar. In this embodiment, the safety ring rests on the shaft collar and covers the predetermined breaking point. If an intermediate shaft is used between the driving machine and the driven machine, the predetermined breaking point is provided in the intermediate shaft.

These two embodiments are particularly suitable in the case of plants including an intermediate shaft with a predetermined breaking point. In the event of a fracture of the intermediate shaft at the predetermined breaking point provided, the safety ring also handles the task of ensuring that the machine runs down harmlessly and of preventing subsequent damage. In addition, the plant outage time is considerably shortened since it is possible to install a new intermediate shaft without great expenditure of time.

The safety ring, which consists of the same material as the shaft or the intermediate shaft, is produced in the following steps: in a turning operation, the safety ring is cut away from the forging blank provided with ring material. The material lost during this operation is compensated during the installation of the safety ring by the axially split bush in such a manner that the bush is inserted between the safety ring and the shaft, the predetermined breaking point on the shaft being completely covered.

In the case of shafts having a collar, the safety ring is cut away from the forging blank of the shaft in such a manner that its inside diameter corresponds to the diameter of the shaft collar. This insures that the safety ring fits accurately against the shaft collar.

In order to achieve anti-seizure properties at friction points different material pairings are provided. In the development including the safety pin, it has been shown to be advantageous, for example, to coat the outside surface of the bearing area of the safety pin with a copper alloy whereas the inside surface of the axial hole in the shaft consists of the shaft material, that is to say of uncoated steel. In the embodiments including the safety ring which rests on the shaft collar, the inside surface of the safety ring is likewise coated with a copper alloy whereas the shaft collar has a normal steel surface. In the arrangement of the axial split bush, the latter consists of a copper alloy whereas the safety ring is formed of the steel of the shaft, the split bush being arranged between two steel surfaces, namely that of the shaft and of the safety ring. However, it is possible to use a bronze alloy or any other combination of materials resulting in anti-seizure properties, instead of the copper alloy.

BRIEF DESCRIPTION OF THE DRAWINGS

Illustrative embodiments of the subject-matter of the invention are shown in a simplified manner in the drawing in which.

DETAILED DESCRIPTION OF THE DRAWINGS

Figure 1:
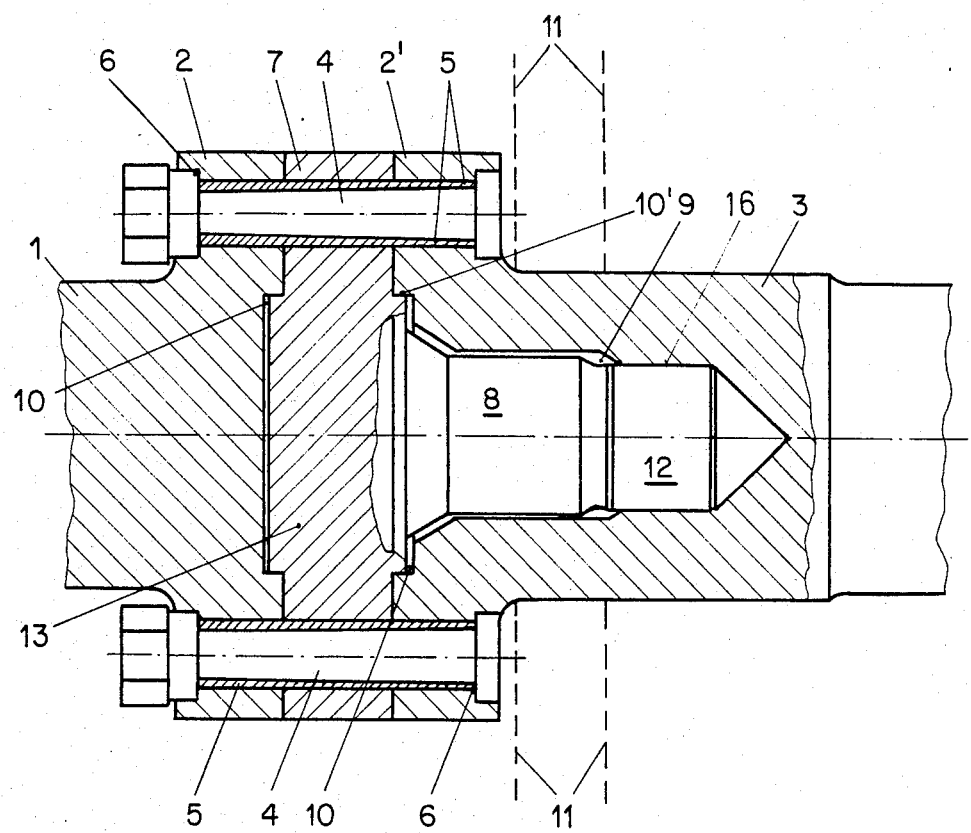
FIG. 1 shows a longitudinal section through a shaft coupling having a safety pin according to the invention, and FIGS. 2a and 2b each show another embodiment, in partial section, of the shaft coupling having a safety ring.

According to FIG. 1, a shaft 1 of a driving machine, for example a gas turbine, is provided with a coupling flange 2. A shaft 3 of a driven machine has a coupling flange 2'. The two coupling flanges 2, 2' have holes 6 and are secure together by coupling bolts 4 which are guided in expandable sleeves 5. On each face of the coupling flanges 2, 2', a recess 10 is provided for centering the shafts 1, 3. Between the two coupling flanges 2, 2', a flange part 7 having projections 10' is arranged and connected to the coupling flanges 2, 2', by means of the coupling bolts 4. The flange part 7 has a central safety pin 8 which engages an axial hole 9 in the shaft 3. An end 12 of the pin has a bearing surface 16 supported almost without play in a countersurface of the hole 9. On the shaft 3, a predetermined breaking point 11 is provided in front of the coupling flange 2'. The pin end 12 extends beyond the axial length of the predetermined breaking point 11 in direction toward the driven machine.

In order to achieve anti-seizure properties, the pin end 12 is coated at the surfaces in contact with the running surface 16 (friction points) of the axial hole 9 with a material having anti-seizure properties. For this purpose, copper alloys or bronze alloys can be used. Other coatings, preventing a frictional seizure between the bearing surface 16 and the wal of axial hole 9 during a shaft fracture, may be used.

In plants in which adequate space exists for an axial installation of the shaft 3, the safety pin 8 can be provided directly on the coupling flange 2. This makes it possible to omit the additional flange part 7 and the coupling flanges 2, 2' can be directly secure together.

In the event of excessive loading of the line of shafting 1, 2, 2', 3, the fracture occurs at the predetermined breaking point 11. As a result of the interaction of the pin end 12 which rests without play against the countersurface of the axial hole 9 and has anti-seizure properties, the fractured shaft part 3 remains approximately in its original position until standstill. Deflection of the shaft and greater subsequent damage cannot occur.

Figure 2A:
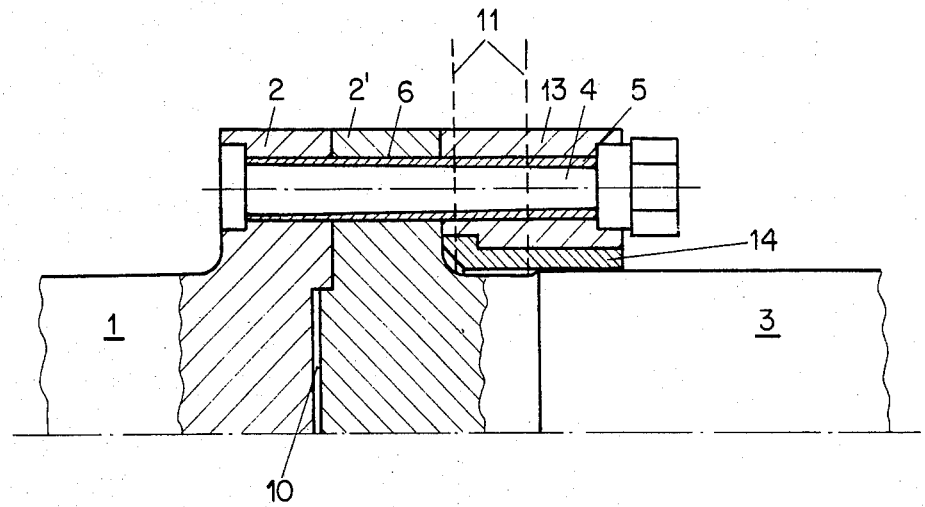

In the embodiment according to FIG. 2a, the shaft 1 of the driving mahcine is connected, analogously to the embodiment of FIG. 1, to the shaft 3 of the driven machine via the coupling flanges 2, 2'. The shaft 3 has, at the transition to the coupling flange 2', the predetermined breaking point 11. Axially overlying that point 11 is a safety ring 13 which is rigidly connected at one end to the coupling flange 2'. Between the safety ring 13 and the shaft 3, an axially split bushing 14 is arranged which also axially overlies the predetermined breaking point 11.

A forging blank from the shaft which carries an annular bead and that bead is used for forming the safety ring. The outside diameter and axial length of this annular bead roughly corresponds to the safety ring 13 which it will eventaully comprise. The shaft 3 is machined in the conventional manner. The annular bead is subsequently cut away to form the ring 13, and is clamped against the coupling flange 2' and provided with holes which are aligned with the axial holes 6 in the coupling flange 2.

Figure 2B:
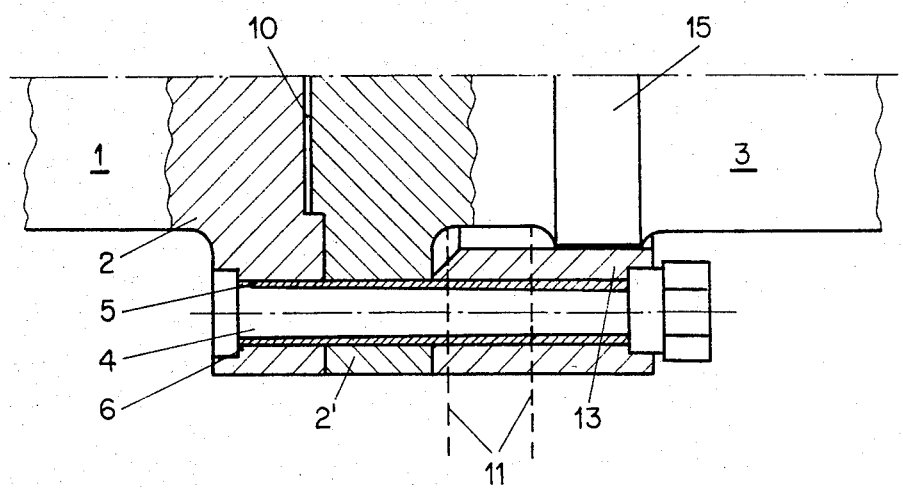

According to an embodiment of FIG. 2b, the shaft 3 has a shaft collar 15. Between the latter and the coupling flange 2', the predetermined breaking point 11 is provided. The safety ring 13 is arranged in such a manner that one end of it is rigidly connected to the coupling flange 2' whereas its other end is supported on the shaft collar 15. The predetermined breaking point 11 is thus covered in its total axial length by the safety ring 13. In manufacturing the safety ring 13 in accordance with this embodiment, there is provided a forging blank for the shaft 3 is used which, apart from the shaft collar 15, carries an annular bead. Since the annular bead is intended to form the safety ring 13, the outside diameter and axial length of this annular bead roughly corresponds to the safety ring 13. The shaft 3 is machined in the conventional manner. Subsequently the annular bead is cut away, clamped together with the coupling flange 2' and provided with holes which are aligned with the axial holes 6 in the coupling flange 2'. In this operation, the annular head is cut away from the shaft 3 in such a manner that its inside diameter is not much greater than the outside diameter of the shaft collar 15 so that it can be pushed over the shaft collar 15 and an adequate play is still available for applying a coating in order to achieve anti-seizure properties.

If, during operation, an overloading of the line of shafting occurs which leads to a fracture at the predetermined breaking point, the safety ring 13 takes over guidance of the fractured shaft in both embodiments (FIGS. 2a and 2b) until the plant has run down and no deflection of the shaft, and thus extensive subsequent damages, occur.

The embodiments of FIGS. 1, 2a and 2b can be utilized regardless of whether the two shafts 1, 2 are coupled directly to each other or if an intermediate shaft is employed which is connected between the shafts 1, 2.

We claim:

1. A shaft coupling arrangement comprising first and second rotatable machine shafts, a coupling flange having bolt receiving holes at an end of each shaft, coupling bolts for coupling said flanges together, said first shaft having an end portion that is structurally weakened to provide a predetermined breaking point spaced axially from said coupling flange, safety means for preventing deflection and fly away of the first shaft in the event said first shaft breaks at the predetermined breaking point, said safety means including a guiding element extending axially from said flange a distance greater than the predetermined breaking point.

2. A shaft coupling arrangement according to claim 1 wherein the safety means comprises a pin which is mounted on the coupling flange of the second shaft and is movably mounted in an axial hole of the first shaft and a free end of the pin has a bearing surface rotatably received in a counter-surface of the axial hole.

3. A shaft coupling arrangement according to claim 2, wherein the pin is constructed to be of one piece with the coupling flange of the second shaft.

4. A shaft coupling arrangement according to claim 2, wherein the pin has a flange part which is bolted between the two coupling flanges.

5. A shaft coupling arrangement according to claim 1, wherein the safety means comprises a ring, firmly connected to the coupling flange of the first shaft.

6. A shaft coupling arrangement according to claim 5, wherein an axially split bush is mounted between the ring and the first shaft which covers the predetermined breaking point.

7. A shaft coupling arrangement according to claim 5, wherein the first shaft is provided with a shaft collar, the predetermined breaking point being located between the shaft collar and the coupling flange of the first shaft and an end of the ring is supported on the shaft collar.

8. A shaft coupling arrangement according to claim 7, wherein a material is provided at the contact points between the ring and the first shaft having anti-seizure properties.

9. A shaft coupling arrangement according to claim 1, wherein a material is provided at the contact points between the safety means and the first shaft having anti-seizure properties.

10. A shaft coupling arrangement according to claim 2, wherein a material is provided at the contact points between the pin and the first shaft having anti-seizure properties.

11. A shaft coupling arrangement according to claim 3, wherein a material is provided at the contact points between the pin and the first shaft having anti-seizure properties.

12. A shaft coupling arrangement according to claim 4, wherein a material is provided at the contact points between the pin and the first shaft having anti-seizure properties.

13. A shaft coupling arrangement according to claim 5, wherein a material is provided at the contact points between the ring and the first shaft having anti-seizure properties.

14. A shaft coupling arrangement according to claim 6, wherein a material is provided at the contact points between the ring and the first shaft having anti-seizure properties.

* * * * *